US012761377B2

(12) United States Patent
Wu et al.

(10) Patent No.: US 12,761,377 B2
(45) Date of Patent: Oct. 13, 2026

(54) METHOD AND DEVICE FOR ACQUIRING GLOBAL NAVIGATION SATELLITE SYSTEM (GNSS) POSITIONING INFORMATION

(71) Applicant: Samsung Electronics Co., Ltd., Gyeonggi-do (KR)

(72) Inventors: Min Wu, Gyeonggi-do (KR); Feifei Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 261 days.

(21) Appl. No.: 18/139,622

(22) Filed: Apr. 26, 2023

(65) Prior Publication Data

US 2023/0350081 A1 Nov. 2, 2023

(30) Foreign Application Priority Data

Apr. 27, 2022 (CN) ......................... 202210459555.7

(51) Int. Cl.

| | |
|---|---|
| ***G01S 19/46*** | (2010.01) |
| ***G01S 19/25*** | (2010.01) |
| ***H04W 72/232*** | (2023.01) |
| ***H04W 74/0833*** | (2024.01) |

(52) U.S. Cl.

CPC .............. *G01S 19/46* (2013.01); *G01S 19/25* (2013.01); *H04W 72/232* (2023.01); *H04W 74/0833* (2013.01)

(58) Field of Classification Search

CPC . G01S 5/01; G01S 19/14; G01S 19/24; G01S 19/25; G01S 19/42; G01S 19/46; H04L 27/0014; H04L 2027/0026; H04W 24/08; H04W 56/0055; H04W 56/0045; H04W 56/001; H04W 64/00; H04W 72/231; H04W 72/232; H04W 74/0833; H04W 76/28; Y02D 30/70

See application file for complete search history.

(56) References Cited

U.S. PATENT DOCUMENTS

| | | | | |
|---|---|---|---|---|
| 11,309,957 | B2 * | 4/2022 | Qaise ................. | H04B 7/18547 |
| 11,579,311 | B2 * | 2/2023 | Cheng ..................... | G01S 19/02 |
| 11,848,747 | B1 * | 12/2023 | Ettus ..................... | H04W 72/02 |
| 12,003,350 | B1 * | 6/2024 | McCormick ....... | H04B 7/18513 |
| 12,041,575 | B2 * | 7/2024 | Akkarakaran ........ | G01S 5/0236 |

(Continued)

OTHER PUBLICATIONS

Moderator (MediaTek), "Summary #5 of AI 8.15.2 Enhancements to Time and Frequency Synchronization", R1-2102266, 3GPP TSG RAN WG1 Meeting #104e, Jan. 25-Feb. 5, 2021, 44 pgs.

(Continued)

*Primary Examiner* — Yuwen Pan
*Assistant Examiner* — Samuel H. Leonard
(74) *Attorney, Agent, or Firm* — The Farrell Law Firm, P.C.

(57) ABSTRACT

The disclosure relates to a 5G or 6G communication system for supporting a higher data transmission rate. The present disclosure provides a method performed by a user equipment (UE) for acquiring global navigation satellite system (GNSS) positioning information is provided. The method includes performing GNSS measurement to acquire the GNSS positioning information, and estimating a time-frequency offset based on the GNSS positioning information for pre-compensation of uplink transmission.

20 Claims, 13 Drawing Sheets

400

(56) References Cited

U.S. PATENT DOCUMENTS

| | | | | |
|---|---|---|---|---|
| 12,349,229 | B2 * | 7/2025 | Jeon | H04W 76/28 |
| 2016/0278033 | A1 * | 9/2016 | Wu | H04W 56/0045 |
| 2018/0299561 | A1 * | 10/2018 | Jau | G01S 19/235 |
| 2021/0266787 | A1 * | 8/2021 | Yoo | H04L 5/0053 |
| 2022/0015148 | A1 * | 1/2022 | Sengupta | H04B 7/18576 |
| 2022/0104084 | A1 * | 3/2022 | Liberg | H04W 60/04 |
| 2022/0124660 | A1 * | 4/2022 | Cheng | H04W 72/23 |
| 2022/0224406 | A1 * | 7/2022 | Xu | H04W 72/02 |
| 2022/0225415 | A1 * | 7/2022 | Shrestha | H04B 7/1851 |
| 2022/0361187 | A1 * | 11/2022 | Sengupta | H04B 7/18513 |
| 2023/0037135 | A1 * | 2/2023 | Luo | H04W 74/0833 |
| 2023/0116580 | A1 * | 4/2023 | Cheng | H04W 56/0035 370/329 |
| 2023/0199857 | A1 * | 6/2023 | Cao | H04B 7/18513 370/329 |
| 2023/0397247 | A1 * | 12/2023 | Jung | H04W 74/0833 |
| 2024/0031009 | A1 * | 1/2024 | Zhang | H04B 7/18502 |
| 2024/0064735 | A1 * | 2/2024 | Atungsiri | H04W 72/1268 |
| 2024/0155527 | A1 * | 5/2024 | Medles | H04W 72/231 |
| 2025/0151012 | A1 * | 5/2025 | Rao | G01S 5/0268 |

OTHER PUBLICATIONS

Intel Corporation, "On UL Time and Frequency Synchronization for NTN", R1-2005874, 3GPP TSG RAN WG1 102-e, Aug. 17-28, 2020, 5 pages.

Samsung, "On Enhancements to Time and Frequency Synchronization", R1-2101243, 3GPP TSG RAN WG1 #104-e, Jan. 25-Feb. 5, 2021, 3 pages.

Moderator (Thales), "FL Summary on Enhancements on UL Time and Frequency Synchronization for NR", R1-2009485, 3GPP TSG-RAN WG1 Meeting #103-e, Oct. 26-Nov. 13, 2020, 44 pgs.

International Search Report dated Jul. 24, 2023 issued in counterpart application No. PCT/KR2023/005734, 9 pages.

International Search Report dated Feb. 17, 2026 issued in counterpart application No. 23796813.6-1206, 8 pages.

* cited by examiner

METHOD AND DEVICE FOR ACQUIRING GLOBAL NAVIGATION SATELLITE SYSTEM (GNSS) POSITIONING INFORMATION

CROSS-REFERENCE TO RELATED APPLICATION

This application is based on and claims priority under 35 U.S.C. § 119(a) to Chinese Patent Application No. 202210459555.7, which was filed in the China National Intellectual Property Administration on Apr. 27, 2022, the entire contents of which are incorporated herein by reference.

BACKGROUND

1. Field

The disclosure relates generally to wireless communication, and more particularly, to a method and device for acquiring GNSS positioning information.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (Bandwidth Part), new channel coding methods such as an LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-mentioned problems and/or disadvantages and to provide at least the advantages described below.

Accordingly, an aspect of the disclosure is to provide a method and apparatus that reduces a number of GNSS measurements in order to conserve power.

Another aspect of the disclosure is to provide improvements in the art for the uplink and downlink synchronization in the NTN.

In accordance with an aspect of the disclosure, a method performed by a UE for acquiring GNSS positioning information includes performing GNSS measurement to acquire the GNSS positioning information, and estimating a time-frequency offset based on the GNSS positioning information for pre-compensation of uplink transmission.

In accordance with an aspect of the disclosure, a method performed by a base station for indicating to a UE to acquire global navigation satellite system GNSS positioning information includes indicating to the UE, through signaling, to perform GNSS measurement to acquire the GNSS positioning information, wherein a time-frequency offset is estimated by the UE based on the GNSS positioning information for pre-compensation of uplink transmission.

In accordance with an aspect of the disclosure, a UE includes a transceiver configured to transmit and receive signals, and a controller coupled to the transceiver and configured to perform a method for acquiring GNSS positioning information, including performing GNSS measurement to acquire the GNSS positioning information, and estimating a time-frequency offset based on the GNSS positioning information for pre-compensation of uplink transmission.

In accordance with an aspect of the disclosure, a base station includes a transceiver configured to transmit and receive signals, and a controller coupled to the transceiver and configured to perform a method for indicating to a UE to acquire GNSS positioning information, including indicating to the UE, through signaling, to perform GNSS measurement to acquire the GNSS positioning information, wherein a time-frequency offset is estimated by the UE based on the GNSS positioning information for pre-compensation of uplink transmission.

Other technical features may be readily apparent to one skilled in the art from the following figures, descriptions, and claims.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
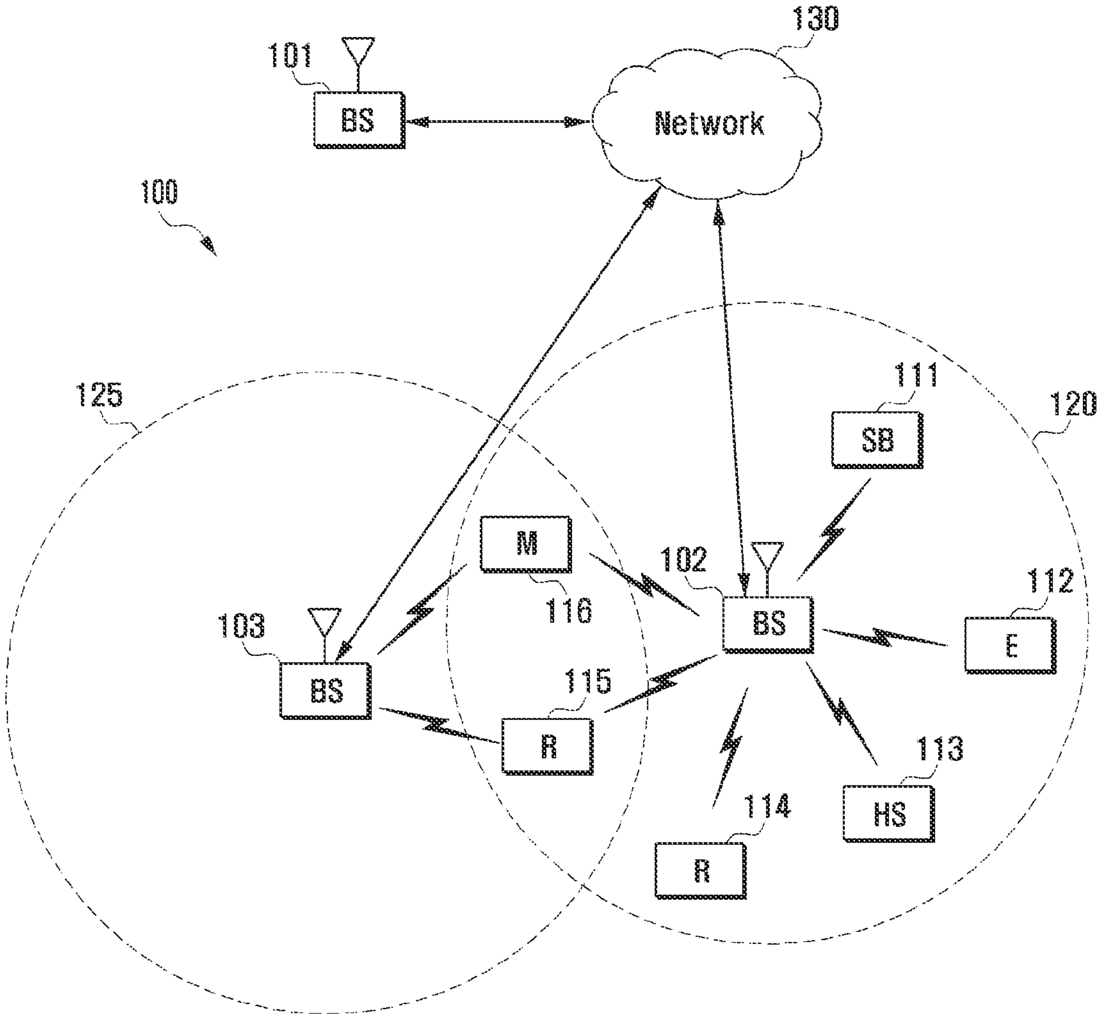
FIG. 1 illustrates a schematic diagram of a wireless network according to an embodiment.

Embodiments of the disclosure are further described below in conjunction with the accompanying drawings.

The description includes various details to assist in that understanding but these are to be regarded as examples. Accordingly, those of ordinary skill in the art will recognize that various changes and modifications of the various embodiments described herein can be made without departing from the scope and spirit of the present disclosure. In addition, descriptions of well-known functions and constructions may be omitted for the sake of clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of the present disclosure is provided for illustration purposes only and not for the purpose of limiting the present disclosure.

It is to be understood that the singular forms “a,” “an,” and “the” include plural referents unless the context clearly dictates otherwise. Thus, for example, reference to “a component surface” includes reference to one or more of such surfaces.

The term “include” or the expression “may include” refers to the existence of a corresponding disclosed function, operation or component which can be used in various embodiments of the disclosure and does not limit one or more additional functions, operations, or components. Terms such as “include” and/or “have” may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term “or” used in embodiments of the disclosure includes any or all of combinations of listed words. For example, the expression “A or B” may include A, may include B, or may include both A and B.

Unless defined differently, all terms used herein, which include technical terminologies or scientific terminologies, have the same meaning as that understood by a person skilled in the art to which the present disclosure pertains. Such terms as those defined in a generally used dictionary are to be interpreted to have the same meanings as the contextual meanings in the relevant field of art, and are not to be interpreted to have ideal or excessively formal meanings unless clearly defined in the present disclosure.

The following sets forth definitions of certain words and phrases used throughout this patent document. The term “couple” and its derivatives refer to any direct or indirect communication between two or more elements, whether or not those elements are in physical contact with one another. The terms “transmit,” “receive,” and “communicate,” as well as derivatives thereof, encompass both direct and indirect communication. The terms “include” and “comprise,” as well as derivatives thereof, mean inclusion without limitation. The term “or” is inclusive, meaning and/or. The phrase “associated with,” as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other words and phrases are provided throughout this patent document. Those of ordinary skill in the art should understand that in many if not most instances, such definitions apply to prior as well as future uses of such defined words and phrases.

FIG. 1 illustrates a wireless network 100 according to an embodiment.

In FIG. 1, the wireless network 100 includes a gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as base station or access point can be used instead of gNB. For convenience, the terms gNodeB and gNB are used in this patent document to refer to network infrastructure components that provide wireless access for remote terminals. And, depending on the type of the network, other well-known terms such as mobile station, user station, remote terminal, wireless terminal or user apparatus can be used instead of user equipment or UE. For convenience, the terms user equipment and UE are used in this patent document to refer to remote wireless devices that wirelessly access the gNB, no matter whether the UE is a mobile device (such as a mobile phone or a smart phone) or a fixed device (such as a desktop computer or a vending machine).

The gNB 102 provides wireless broadband access to the network 130 for a first plurality of UEs within a coverage area 120 of gNB 102. The first plurality of UEs include a UE 111 located in a small business (SB), a UE 112 located in an enterprise (E), a UE 113 located in a wireless fidelity (WiFi) hotspot (HS), a UE 114 located in a first residence (R), a UE 115 located in a second residence (R), and a UE 116, which may be a mobile device (M), such as a cellular phone, a wireless laptop computer, or a wireless personal data assistant (PDA), for example. The gNB 103 provides wireless broadband access to network 130 for a second plurality of UEs within a coverage area 125 of gNB 103. The second plurality of UEs include a UE 115 and a UE 116. One or more of gNBs 101-103 can communicate with each other and with UEs 111-116 using 5G, LTE, LTE-A, WiMAX or other advanced wireless communication technologies.

The dashed lines show approximate ranges of the coverage areas 120 and 125 as approximate circles for illustration purposes. It should be clearly understood that these coverage areas may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a two-dimensional 2D antenna array and may support codebook designs and structures for systems with 2D antenna arrays.

Although FIG. 1 illustrates an example of the wireless network 100, various changes can be made to FIG. 1. For example, the wireless network 100 can include any number of gNBs and any number of UEs in any suitable arrangement, the gNB 101 can directly communicate with any number of UEs and provide wireless broadband access to the network 130 for those UEs, each gNB 102-103 can directly communicate with the network 130 and provide direct wireless broadband access to the network 130 for the UEs, and gNB 101, 102 and/or 103 can provide access to other or additional external networks, such as external telephone networks or other types of data networks.

Figure 2A:
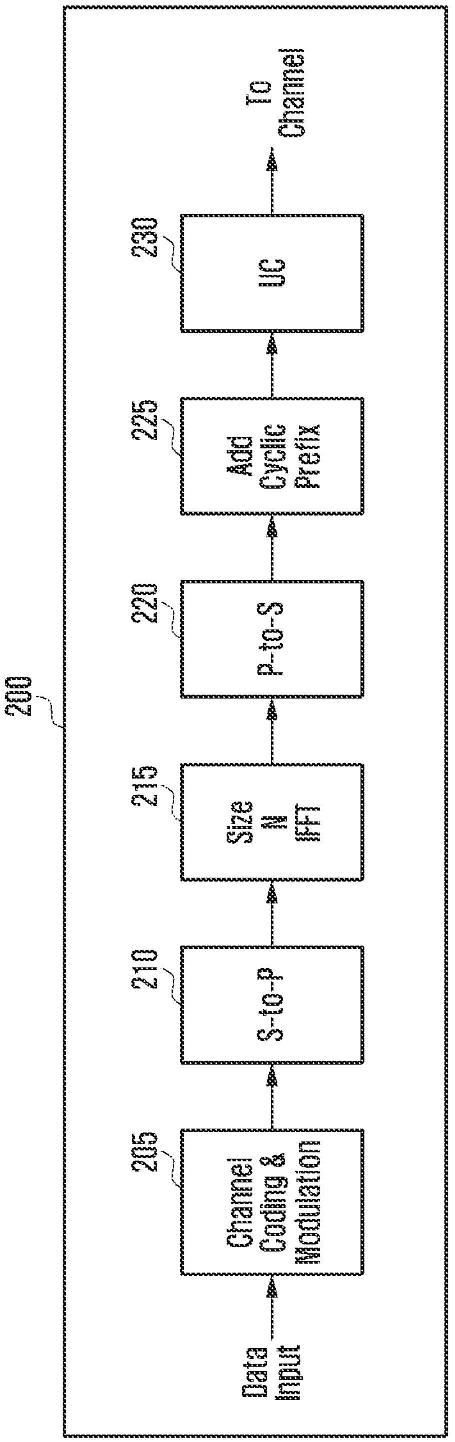
FIGS. 2A and 2B illustrate wireless transmission and reception paths according to an embodiment.
Figure 2B:
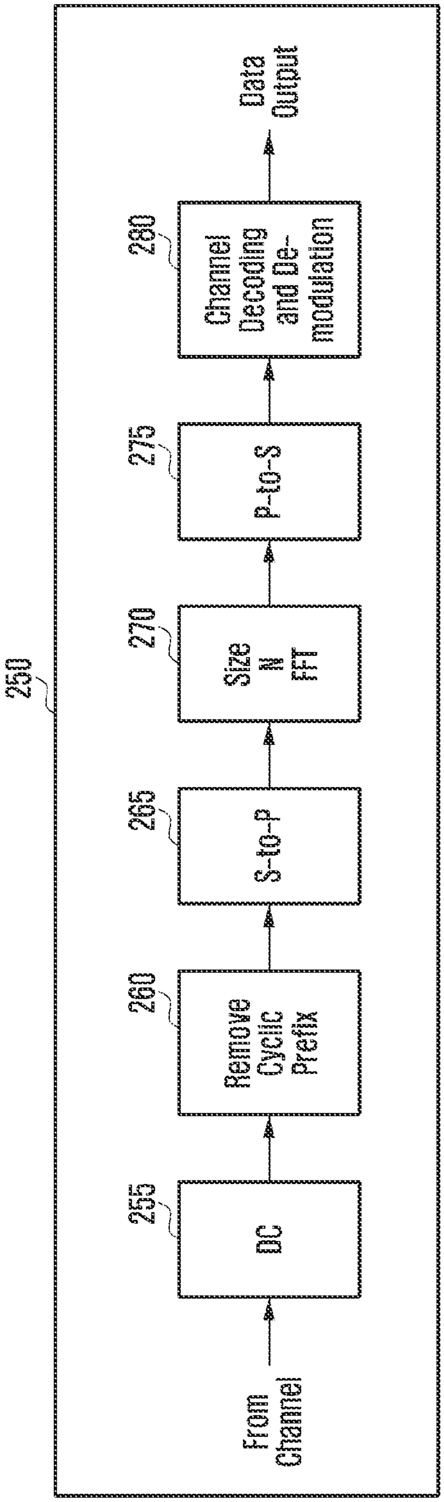

FIGS. 2A and 2B illustrate wireless transmission and reception paths according to an embodiment. Herein, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. The reception path 250 is configured to support codebook designs and structures for systems with 2D antenna arrays as described herein.

In FIG. 2A, the transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230.

In FIG. 2B, the reception path 250 includes a down-converter (DC) 255, a cyclic prefix removal block 260, an S-to-P block 265, a size N fast Fourier transform (FFT) block 270, a P-to-S block 275, and a channel decoding and demodulation block 280.

In the transmission path 200, the channel coding and modulation block 205 receives a set of information bits, applies coding such as low density parity check (LDPC) coding, and modulates the input bits, such as by using quadrature phase shift keying (QPSK) or QAM to generate a sequence of frequency-domain modulated symbols. The S-to-P block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The P-to-S block 220 converts (such as multiplexes) parallel time-domain output symbols from the Size N IFFT block 215 to generate a serial time-domain signal. The cyclic prefix addition block 225 inserts a cyclic prefix into the time-domain signal. The UC 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The DC 255 down-converts the received signal to a baseband frequency, and the cyclic prefix removal block 260 removes the cyclic prefix to generate a serial time-domain baseband signal. The S-to-P block 265 converts the time-domain baseband signal into a parallel time-domain signal. The size N FFT block 270 performs an FFT algorithm to generate N parallel frequency-domain signals. The P-to-S block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting data to UEs 111-116 in the downlink, and may implement a reception path 250 similar to that for receiving data from UEs 111-116 in the uplink. Similarly, each of UEs 111-116 may implement a transmission path 200 for transmitting data to gNBs 101-103 in the uplink, and may implement a reception path 250 for receiving data from gNBs 101-103 in the downlink.

Each of the components in FIGS. 2A and 2B can be implemented using only hardware or using a combination of hardware and software/firmware. For example, at least some of the components in FIGS. 2A and 2B may be implemented in software, while other components may be implemented in configurable hardware or a combination of software and configurable hardware. The FFT block 270 and IFFT block 215 may be implemented as configurable software algorithms, in which the value of the size N may be modified according to the implementation.

Although described as using FFT and IFFT, this is only illustrative and should not be interpreted as limiting the scope of the disclosure. Other types of transforms can be used, such as discrete Fourier transform (DFT) and inverse DFT (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate wireless transmission and reception paths, various changes may be made to FIGS. 2A and 2B. For example, various components in FIGS. 2A and 2B can be combined, further subdivided or omitted, and additional components can be added according to specific requirements. FIGS. 2A and 2B illustrate types of transmission and reception paths that can be used in a wireless network. Any other suitable architecture can be used to support wireless communication in a wireless network.

Figure 3A:
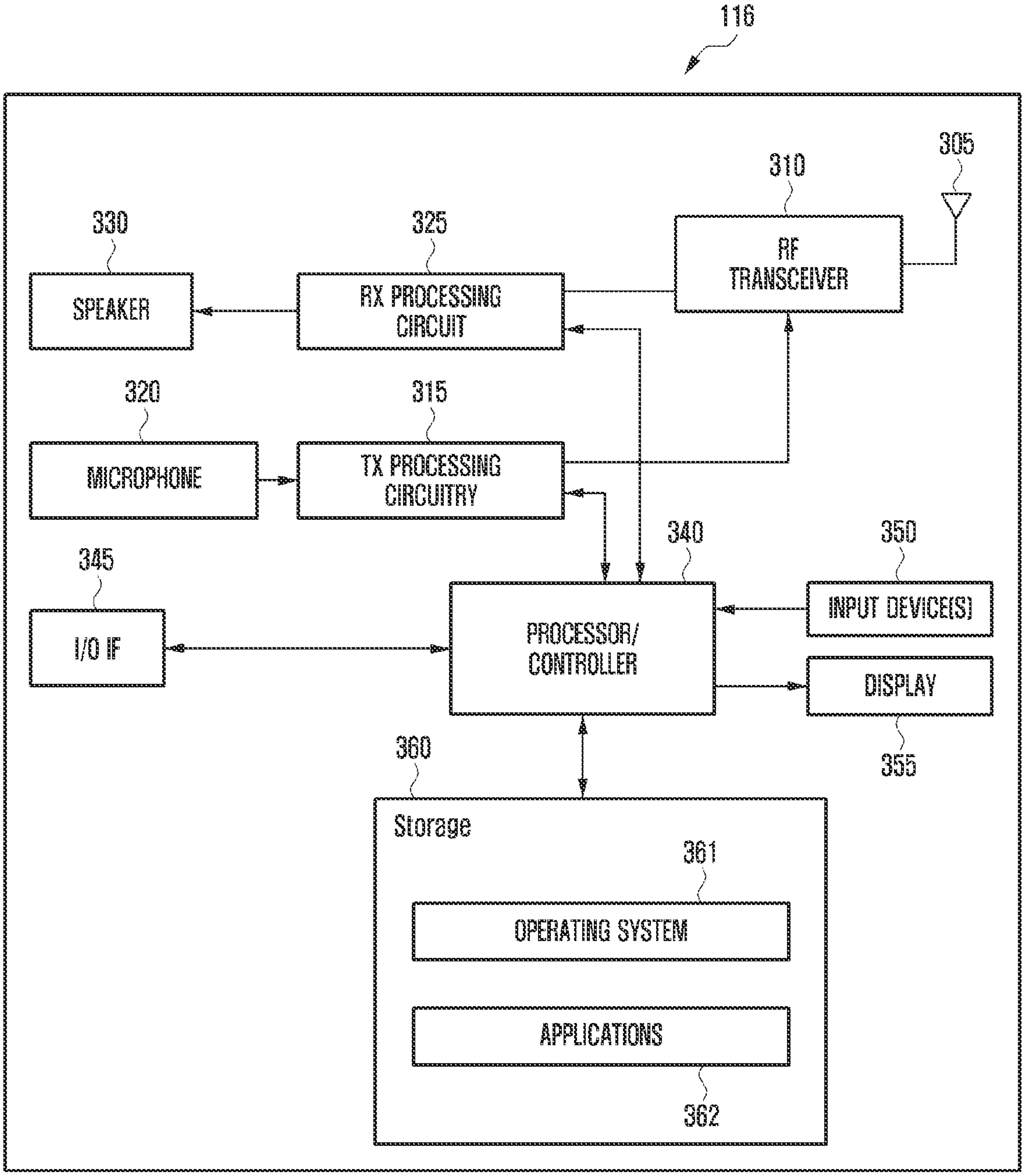
FIG. 3A illustrates a UE according to an embodiment.

FIG. 3A illustrates a UE 116 according to an embodiment.

In FIG. 3A, the UE 116 includes an antenna 305, a radio frequency (RF) transceiver 310, a transmission (TX) processing circuit 315, a microphone 320, a reception (RX) processing circuit 325, a speaker 330, a processor/controller 340, an input/output (I/O) interface (IF) 345, an input device(s) 350, a display 355, and a memory 360 including an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency or baseband signal. The intermediate frequency or baseband signal is transmitted to the RX processing circuit 325, which generates a processed baseband signal by filtering, decoding and/or digitizing the baseband or intermediate frequency signal. The RX processing circuit 325 transmits the processed baseband signal to the speaker 330 (such as for voice data) or to the processor/controller 340 for further processing (such as for web browsing data).

The TX processing circuit 315 receives analog or digital voice data from the microphone 320 or other outgoing baseband data (such as network data, email or interactive video game data) from the processor/controller 340. The TX processing circuit 315 encodes, multiplexes, and/or digitizes the outgoing baseband data to generate a processed baseband or intermediate frequency signal. The RF transceiver 310 receives the outgoing processed baseband or intermediate frequency signal from the TX processing circuit 315 and up-converts the baseband or intermediate frequency signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. The processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. The processor/controller 340 is configured to execute the application 362 based on the OS 361 or in response to signals received from the gNB or the operator. The processor/controller 340 is also coupled to an I/O IF 345 that provides the UE 116 with the ability to connect to other devices such as laptop computers and handheld computers. The I/O IF 345 is a communication path between these accessories and the processor/controller 340.

The processor/controller 340 is also coupled to the input device(s) 350 and the display 355. An operator of UE 116 can input data into the UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. For example, the processor/controller 340 can be divided into a plurality of processors, such as one or more central processing units (CPUs) and one or more graphics processing units (GPUs). Although FIG. 3A illustrates that the UE 116 is configured as a mobile phone or a smart phone, UEs can be configured to operate as other types of mobile or fixed devices.

Figure 3B:
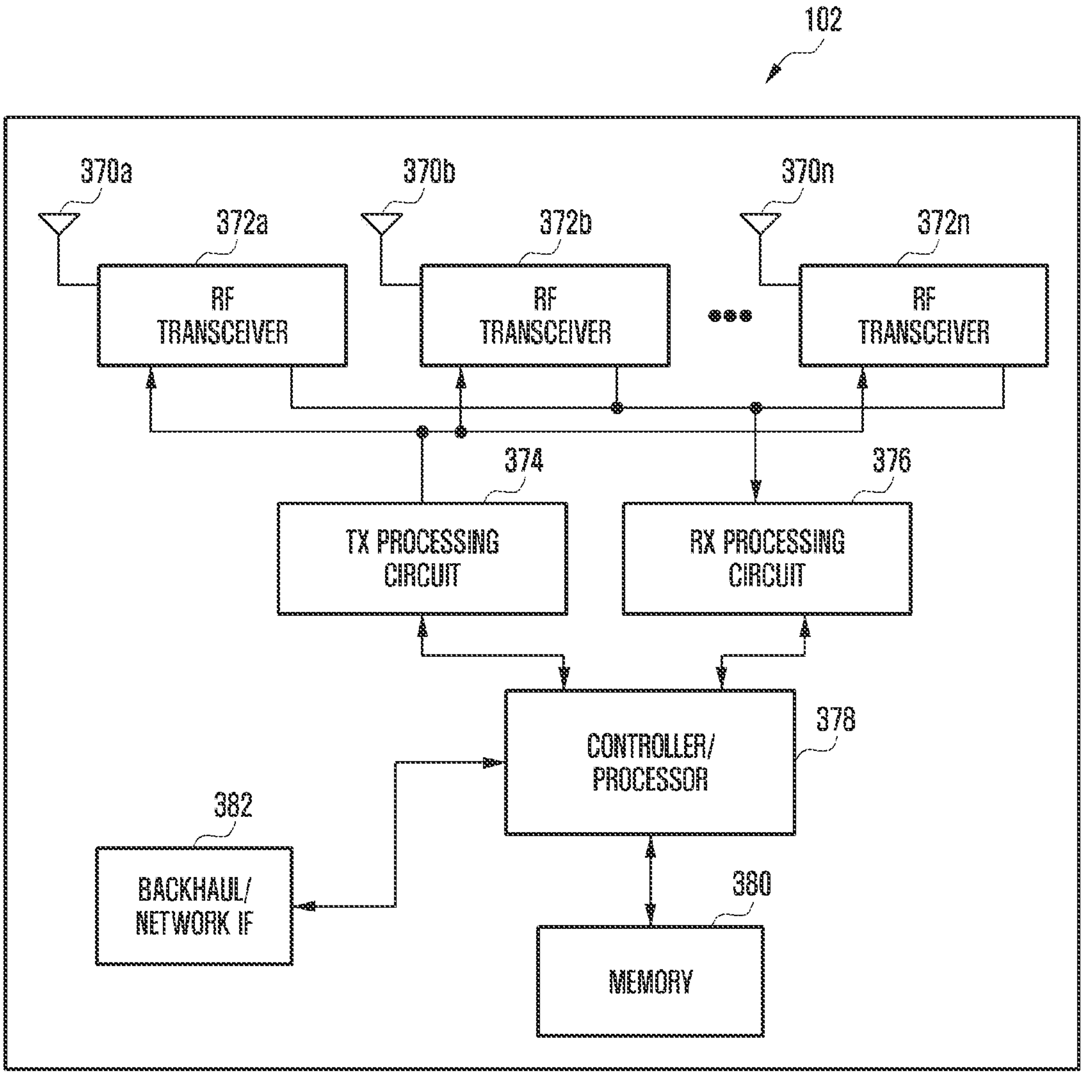
FIG. 3B illustrates a g NodeB (gNB) according to an embodiment.

FIG. 3B illustrates a gNB 102 according to an embodiment.

In FIG. 3B, the gNB 102 includes a plurality of antennas 370*a*-370*n*, a plurality of RF transceivers 372*a*-372*n*, a transmission (TX) processing circuit 374, and a reception (RX) processing circuit 376. One or more of the plurality of antennas 370*a*-370*n* include a 2D antenna array. The gNB 102 also includes a controller/processor 378, a memory 380, and a backhaul or network IF 382.

RF transceivers 372*a*-372*n* receive an incoming RF signal from antennas 370*a*-370*n*, such as a signal transmitted by UEs or other gNBs. RF transceivers 372*a*-372*n* down-convert the incoming RF signal to generate an IF or baseband signal. The intermediate frequency or baseband signal is transmitted to the RX processing circuit 376 which generates a processed baseband signal by filtering, decoding and/or digitizing the baseband or the intermediate frequency signal. The RX processing circuit 376 transmits the processed baseband signal to the controller/processor 378 for further processing.

The TX processing circuit 374 receives analog or digital data (such as voice data, network data, email or interactive video game data) from the controller/processor 378. The TX processing circuit 374 encodes, multiplexes and/or digitizes outgoing baseband data to generate a processed baseband or Intermediate frequency signal. The RF transceivers 372*a*-372*n* receive the outgoing processed baseband or Intermediate frequency signal from TX processing circuit 374 and up-converts the baseband or intermediate frequency signal into an RF signal transmitted via antennas 370*a*-370*n*.

The controller/processor 378 can include one or more processors or other processing devices that control the overall operation of the gNB 102. For example, the controller/processor 378 can control the reception of forward channel signals and the transmission of backward channel signals through the RF transceivers 372*a*-372*n*, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm and decode a received signal from which an interference signal is subtracted. A controller/processor 378 may support any of a variety of other functions in the gNB 102. The controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described herein. The controller/processor 378 supports communication between entities such as web real time communications (RTCs) and moves data into or out of the memory 380 as required by an execution process.

The controller/processor 378 is also coupled to the backhaul or network IF 382 which enables the gNB 102 to communicate with other devices or systems through a backhaul connection or through a network. The backhaul or network IF 382 can support communication over any suitable wired or wireless connection(s). For example, when the gNB 102 is implemented as a part of a cellular communication system, such as a cellular communication system supporting 5G or new radio access technology or new radio (NR), LTE or LTE-A, the backhaul or network IF 382 can enable the gNB 102 to communicate with other gNBs through wired or wireless backhaul connections. When the gNB 102 is implemented as an access point, the backhaul or network IF 382 can enable the gNB 102 to communicate with a larger network, such as the Internet, through a wired or wireless local area network or through a wired or wireless connection. The backhaul or network IF 382 includes any suitable structure that supports communication through a wired or wireless connection, such as an Ethernet or an RF transceiver.

The memory 380 is coupled to the controller/processor 378. Apart of the memory 380 can include an RAM, while another part of the memory 380 can include a flash memory or other ROMs. A plurality of instructions, such as the BIS algorithm, are stored in the memory. The plurality of instructions is configured to cause the controller/processor 378 to execute the BIS process and decode the received signal after subtracting at least one interference signal determined by the BIS algorithm.

As will be described in more detail below, the transmission and reception paths of the gNB 102 (implemented using RF transceivers 372*a*-372*n*, TX processing circuit 374 and/or RX processing circuit 376) support aggregated communication with frequency division duplex (FDD) and time division duplex (TDD) cells.

Although FIG. 3B illustrates an example of the gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. Although shown as including a single instance of the TX processing circuit 374 and a single instance of the RX processing circuit 376, the gNB 102 can include multiple instances of each (such as one for each RF transceiver).

Figure 4:
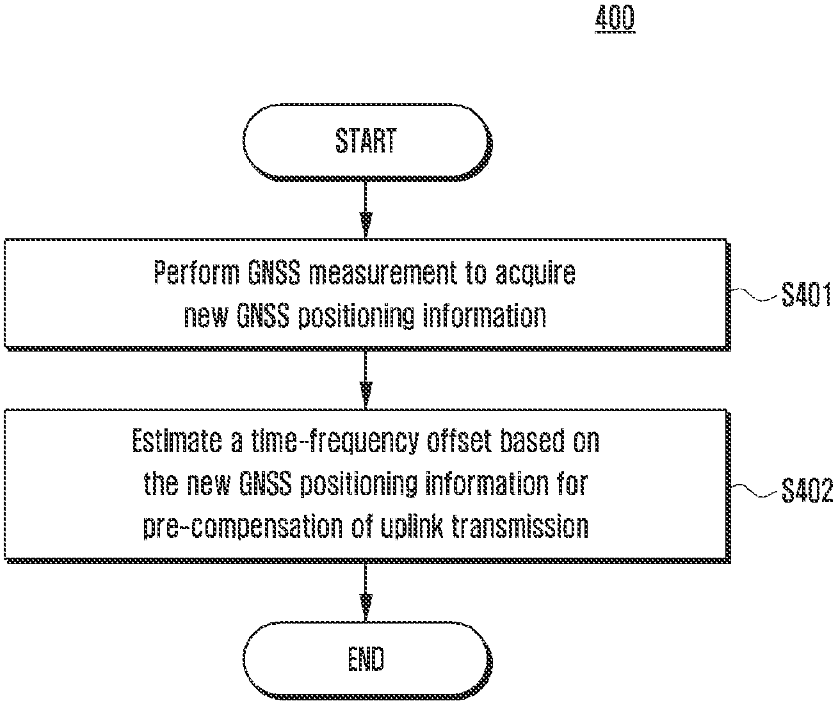
FIG. 4 illustrates a method for acquiring GNSS positioning information according to an embodiment.

FIG. 4 illustrates a method 400 for acquiring GNSS positioning information according to an embodiment. The GNSS measurement may be triggered at a UE side to acquire new GNSS positioning information.

In step S401, the UE performs the GNSS measurement to acquire the new GNSS positioning information.

The GNSS measurement may be triggered by the UE when at least one of the following (predefined) conditions is satisfied: uplink data of the UE is arriving, such that there is data to be transmitted in an uplink logical channel buffer; a validity time of GNSS positioning information previously used by the UE has expired, wherein the validity time may be reported by the UE, configured by the base station, or predefined; a time alignment timer TimeAlignmentTimer of the UE has expired; a duration of a discontinuous reception (DRX) inactivity time of the UE exceeds a preset threshold value; an uplink of the UE is out of synchronization; a time interval from the last uplink transmission of the UE exceeds a preset threshold value; a moving distance of the UE exceeds a preset threshold value; and the UE continuously fails in N random access procedures, where N is an integer greater than 1 and reaches a preset threshold value, and a time offset and a frequency offset for pre-compensation of PRACH transmission of the N random access procedures are all obtained based on previous GNSS positioning information.

The UE triggers the GNSS measurement only under a specific condition, in order to reduce a number of GNSS measurements, thereby reducing the power consumption of the UE. For example, even if the validity time of the GNSS positioning information used by the UE has expired, if no uplink data of the UE arrives, and/or if the uplink transmission of the UE is not out of synchronization, the UE may not trigger the GNSS measurement. In other words, it is not necessary to trigger the GNSS measurement when the validity time of the GNSS positioning information expires.

In step S402, the UE estimates a time-frequency offset based on the new GNSS positioning information for pre-compensation of uplink transmission. For example, the estimated time-frequency offset is used for the pre-compensation of PRACH transmission.

If the UE triggers the GNSS measurement to acquire the new GNSS positioning information, a GNSS module of the UE performs the GNSS measurement, and the GNSS module transfers GNSS positioning information obtained based on the measurement to a wireless communication module of the UE. The wireless communication module estimates a time offset and a frequency offset of a wireless link between the UE and a satellite based on the latest GNSS positioning information and location information broadcast by the satellite, and uses the offsets for the pre-compensation of uplink transmission.

Figure 5:
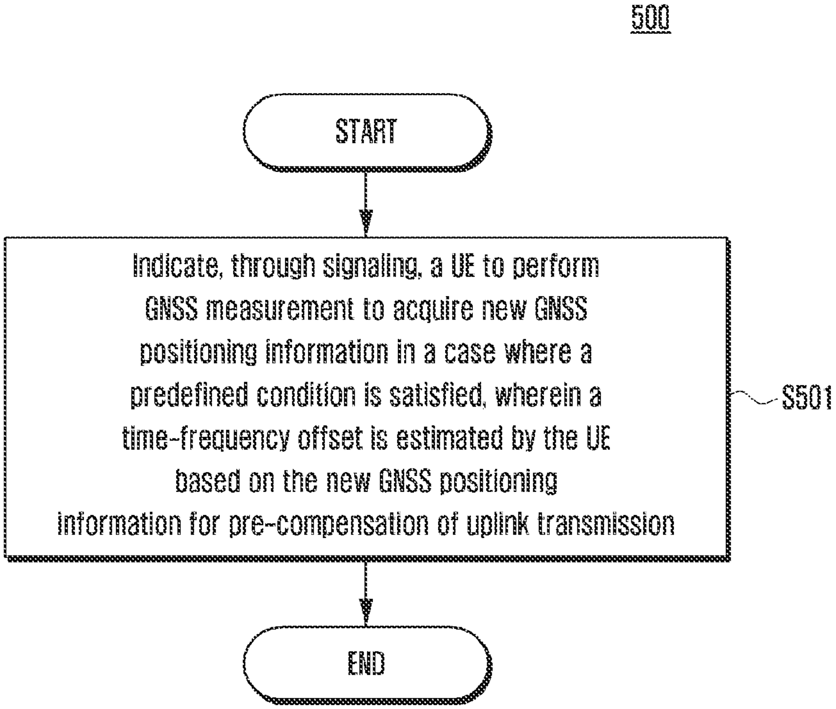
FIG. 5 illustrates a method for acquiring GNSS positioning information according to an embodiment.

FIG. 5 illustrates a method 500 for acquiring GNSS positioning information according to an embodiment, wherein a UE may be triggered to perform GNSS measurement at a base station side to acquire new GNSS positioning information.

In step S501, the base station indicates to the UE, through signaling, to perform the GNSS measurement to acquire the new GNSS positioning information when a predefined condition is satisfied, wherein a time-frequency offset is estimated by the UE based on the new GNSS positioning information for pre-compensation of uplink transmission.

Figure 6:
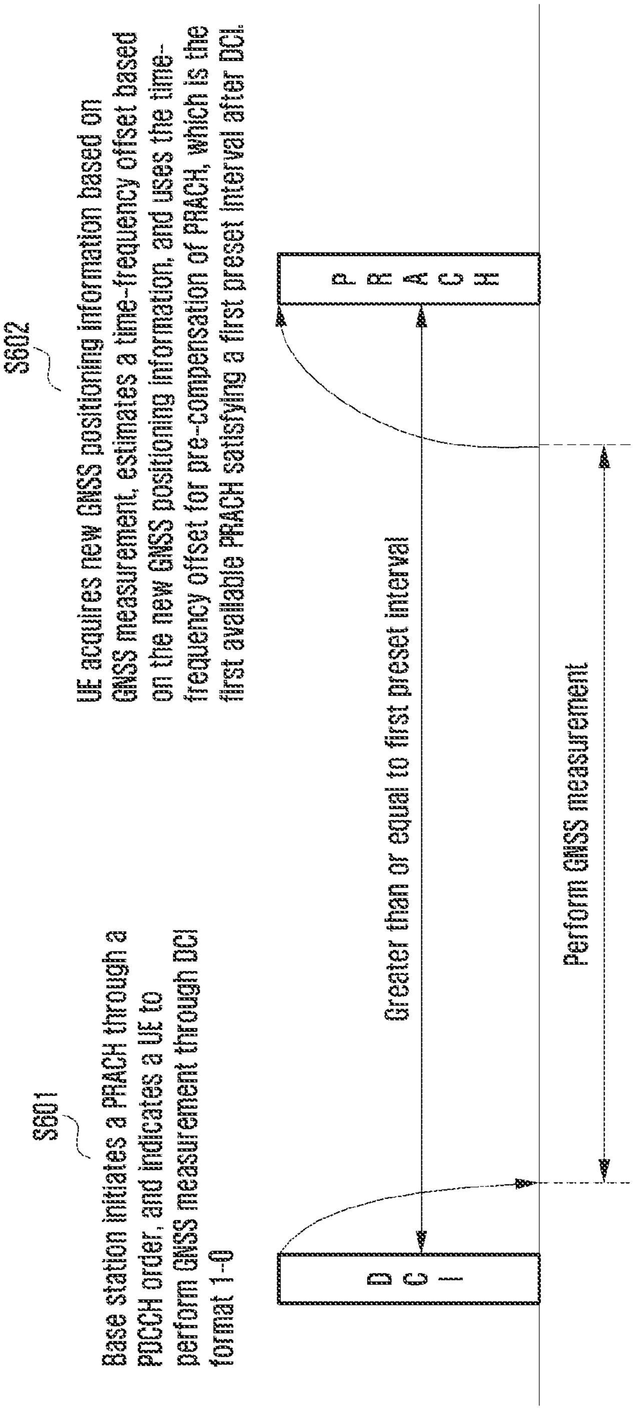
FIG. 6 illustrates a schematic diagram of performing GNSS measurement according to an embodiment.

FIG. 6 illustrates a schematic diagram of performing GNSS measurement according to an embodiment. The UE performing the GNSS measurement to acquire the new GNSS positioning information may be triggered by the base station. For example, if downlink data of the UE arrives and an uplink of the UE is out of synchronization, the base station may indicate to the UE, through signaling, to perform the GNSS measurement to acquire the new GNSS positioning information, and the base station may indicate to the UE, through downlink control information (DCI), to perform the GNSS measurement to acquire the new GNSS positioning information. The DCI may also indicate related information of a GNSS measurement window within which the UE performs the GNSS measurement.

When one or more of the following (predefined) conditions are satisfied, the base station indicates to the UE to acquire the new GNSS positioning information: downlink data of the UE is arriving, such that there being the downlink data to be transmitted for the UE; a validity time of GNSS positioning information previously used by the UE has expired; a time alignment timer of the UE has expired; a duration of a DRX inactivity time of the UE exceeds a preset threshold value; an uplink of the UE is out of synchronization; a time interval from the last uplink transmission of the UE exceeds a preset threshold value; or a moving distance of the UE estimated by the base station exceeds a preset threshold value.

For example, if the validity time of the GNSS positioning information previously used by the UE has expired, and the downlink data to be transmitted of the UE exists, and/or the base station finds that the uplink of the UE is out of synchronization, the base station may indicate to the UE to perform the GNSS measurement to establish uplink synchronization as soon as possible, so as to reduce the delay of downlink data transmission and improve the user experience.

In step 601 in FIG. 6, the base station may indicate to the UE, in DCI initiating a PRACH procedure through a physical downlink control channel (PDCCH) order, to perform the GNSS measurement to acquire the new GNSS positioning information. For example, an existing specific DCI format, such as DCI format 1-0, is reused. If a cyclic redundancy check (CRC) of the DCI format 1_0 is scrambled by a cell radio network temporary identifier (C-RNTI) value, and indication values of all bits of a "frequency-domain resource allocation" field of the DCI format 1_0 are "1", the DCI format 1_0 initiates the PRACH procedure through the PDCCH order, and remaining indication fields include not only existing random access preamble index: 6 bits, uplink/supplementary uplink (UL/SUL) indicator: 1 bit, synchronization signal/physical broadcast channel(SS/PBCH) index: 6 bits, and PRACH mask index: 5 bits, but also at least one of the following indication fields.

Specifically, in step 602, the UE acquires new positioning information based on GNSS measurement, estimates a time-frequency offset based on the new GNSS positioning information, and uses the time-frequency offset for pre-compensation of the PRACH, which is the first available PRACH satisfying a first preset interval after the DCI. For example, reserved bits of the existing DCI format 1-0 initiating the PRACH procedure through the PDCCH order are used as at least one of the following indication fields:

- triggering of GNSS measurement: 1 bit, an indication value of "1" denotes that the UE is required to perform the GNSS measurement to acquire the new positioning information, and use the time-frequency offset estimated based on the new GNSS positioning information for pre-compensation of the PRACH initiated by the PDCCH order, the indication value of "0" denotes that the UE is not required to perform the GNSS measurement to acquire the new positioning information, and the UE uses a time-frequency offset estimated based on previous GNSS positioning information for the pre-compensation of the PRACH initiated by the PDCCH order;
- length of GNSS measurement window: one of multiple predefined or preconfigured values is indicated by X bits, where X is a predefined value. This indication field is used to indicate a length of the GNSS measurement window. The UE should perform the GNSS measurement within the GNSS measurement window, such that a duration for the UE to perform the GNSS measurement should not exceed the length of the measurement window;
- start location of GNSS measurement window: one of multiple predefined or preconfigured values is indicated by N bits, where N is a predefined value. This indication field is used to indicate a size of a time-domain interval between the start location of the GNSS measurement window and the DCI format 1-0, and the UE starts the GNSS measurement window at a location satisfying the indicated interval after the DCI format 1-0.

The DCI format 1-0 also includes several reserved bits, and indication values of all reserved bits are "0".

Assuming that the UE monitors the above DCI format 1-0 initiating the PRACH procedure through the PDCCH order, if the indication value of the "triggering of GNSS measurement" field of the DCI format 1-0 is "1", the UE performs the GNSS measurement to acquire the new GNSS positioning information, estimates the time-frequency offset based on the new GNSS positioning information, and then uses the estimated time-frequency offset for the pre-compensation of the PRACH initiated by the DCI format 1-0.

If the indication value of the "triggering of GNSS measurement" field of DCI format 1-0 is "0", the UE is not required to perform the GNSS measurement to acquire the new positioning information, and the UE uses the time-frequency offset estimated based on the previous GNSS positioning information for the pre-compensation of the PRACH initiated by the PDCCH order. Whether the UE performs the GNSS measurement will affect a location of the PRACH initiated through the PDCCH order, That is, in two cases, the location of the PRACH transmitted by the UE is different. For example, if the UE does not perform the GNSS measurement, the PRACH transmitted by the UE is a PRACH that is determined according to the PRACH mask index in the first radio frame or slot after the DCI format 1-0.

If the UE performs the GNSS measurement, the PRACH transmitted by the UE is a PRACH that is determined according to the PRACH mask index in the first radio frame or slot after completing the GNSS measurement. That is, the PRACH transmitted by the UE will be delayed for some time due to the GNSS measurement. For example, the PRACH transmitted by the UE will be delayed for the first slot after completing the GNSS measurement.

An interval between the PRACH initiated by the PDCCH order and the DCI format 1-0 should satisfy a first preset interval, and the UE performs the GNSS measurement in the first preset interval. That is, the PRACH initiated by the PDCCH order is a PRACH that is determined according to the PRACH mask index in the first radio frame or slot satisfying the first preset interval after the DCI format 1-0, and the first preset interval includes at least one of a processing time for decoding the DCI format 1-0 by the UE, a preparation time of the GNSS measurement, a duration required for performing the GNSS measurement, a duration required for a GNSS module to transfer the GNSS positioning information to a wireless communication module, a duration required for the UE to estimate the time-frequency offset based on the GNSS positioning information, and a preparation time for transmitting the PRACH. A value of the first preset interval is predefined, preconfigured by the base station, or reported by the UE, and may be related to a UE capability. It is unnecessary to introduce the specification of the GNSS measurement window, and the UE may perform the GNSS measurement in the first preset interval by the implementation, such as by itself.

Figure 7A:
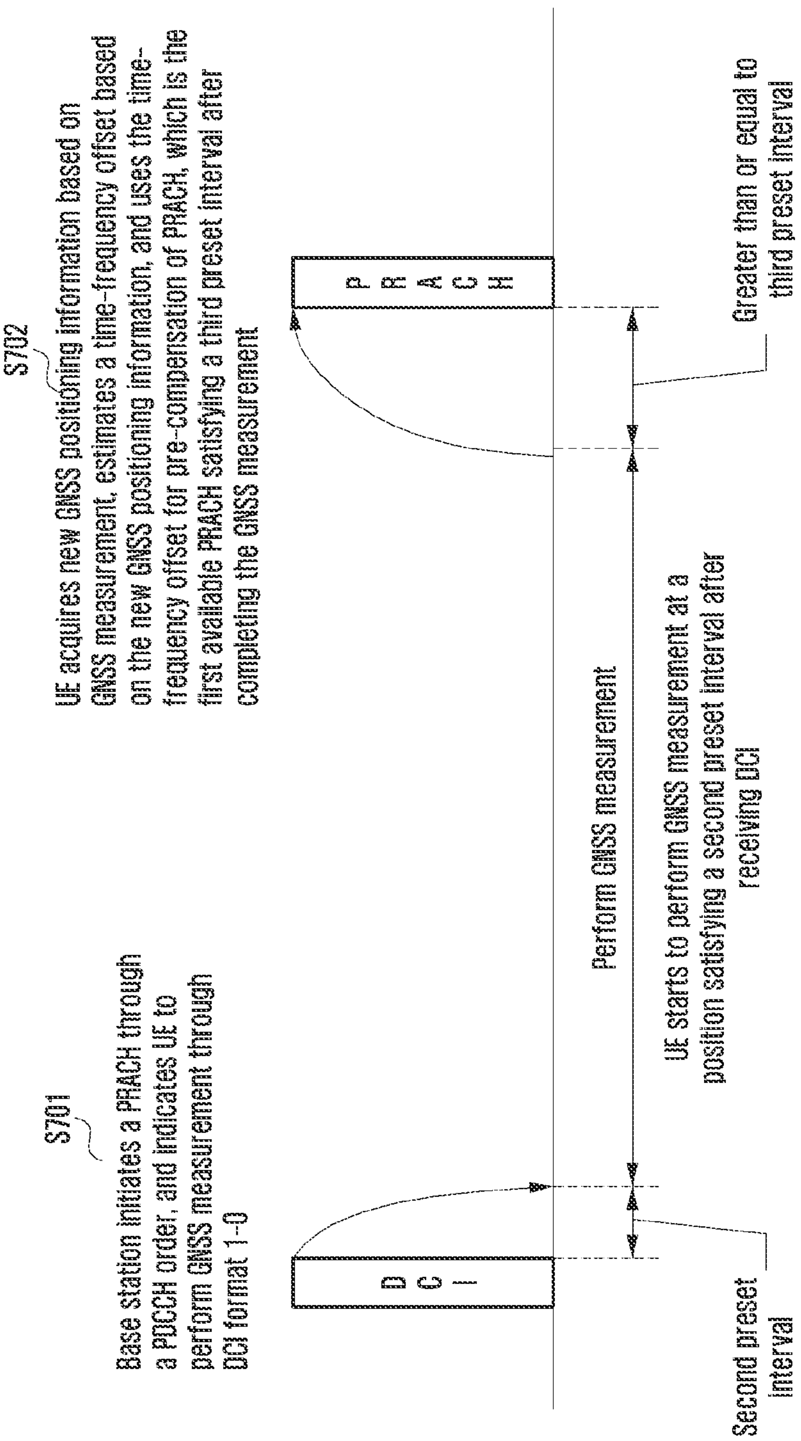
FIG. 7A illustrates a schematic diagram of performing GNSS measurement according to an embodiment.

FIG. 7A illustrates a schematic diagram of performing GNSS measurement according to an embodiment. In step 701, the gNB initiates a PRACH through a PDCCH order, and indicates to the UE to perform GNSS measurement through a DCI format 1-0. In step 702, the UE acquires new GNSS positioning information based on GNSS measurement, estimates a time-frequency offset based on the new GNSS positioning information, and uses the time-frequency offset for pre-compensation of the PRACH, which is the first available PRACH satisfying a third present interval after completing the GNSS measurement.

In more detail, the UE determines a location of the GNSS measurement window and performs the GNSS measurement within the GNSS measurement window. The PRACH initiated by the PDCCH order is the first available PRACH after the GNSS measurement window, that is, the PRACH initiated by the PDCCH order is a PRACH that is determined according to the PRACH mask index in the first radio frame or slot after the GNSS measurement window. For example, the UE determines the location of the GNSS measurement window according to indication information of the “length of GNSS measurement window” and/or “start location of GNSS measurement window” of the DCI format 1-0, or the UE determines the location of the GNSS measurement window according to information related to the length and/or the start location of the GNSS measurement window, which is predefined, preconfigured by the base station through higher layer signaling, or reported by the UE. The specific locational relationship is shown in FIG. 7A.

The UE limits the GNSS measurement within the GNSS measurement window, and the length of the GNSS measurement window includes at least one of the time required for the UE to perform the GNSS measurement, the time required for the GNSS module to transfer the GNSS positioning information to the wireless communication module, and the time required for the UE to estimate the time-frequency offset based on the GNSS positioning information. The UE does not expect to receive a downlink signal transmitted by the base station and/or does not expect to transmit an uplink signal to the base station within the GNSS measurement window. The location of the GNSS measurement window may be configured semi-statically or determined based on a location of the DCI format 1-0. The related information of the GNSS measurement window may be predefined, configured by the base station, or reported by the UE. In addition, an interval between the start location of the GNSS measurement window and the location of the DCI format 1-0 should be greater than or equal to a second preset interval, which includes at least one of the processing time for decoding the DCI format 1-0 by the UE, the preparation time of the GNSS measurement, and a size of the second preset interval is predefined, configured by the base station, or reported by the UE; and/or, an interval between the PRACH transmitted by the UE and the GNSS measurement window should not be less than a third preset interval, which includes the preparation time of the PRACH transmission, and a size of the third preset interval is predefined, configured by the base station, or reported by the UE. For example, the PRACH initiated by the PDCCH order is determined according to the PRACH mask index in the first radio frame or slot satisfying the third preset interval after the GNSS measurement window.

Figure 7B:
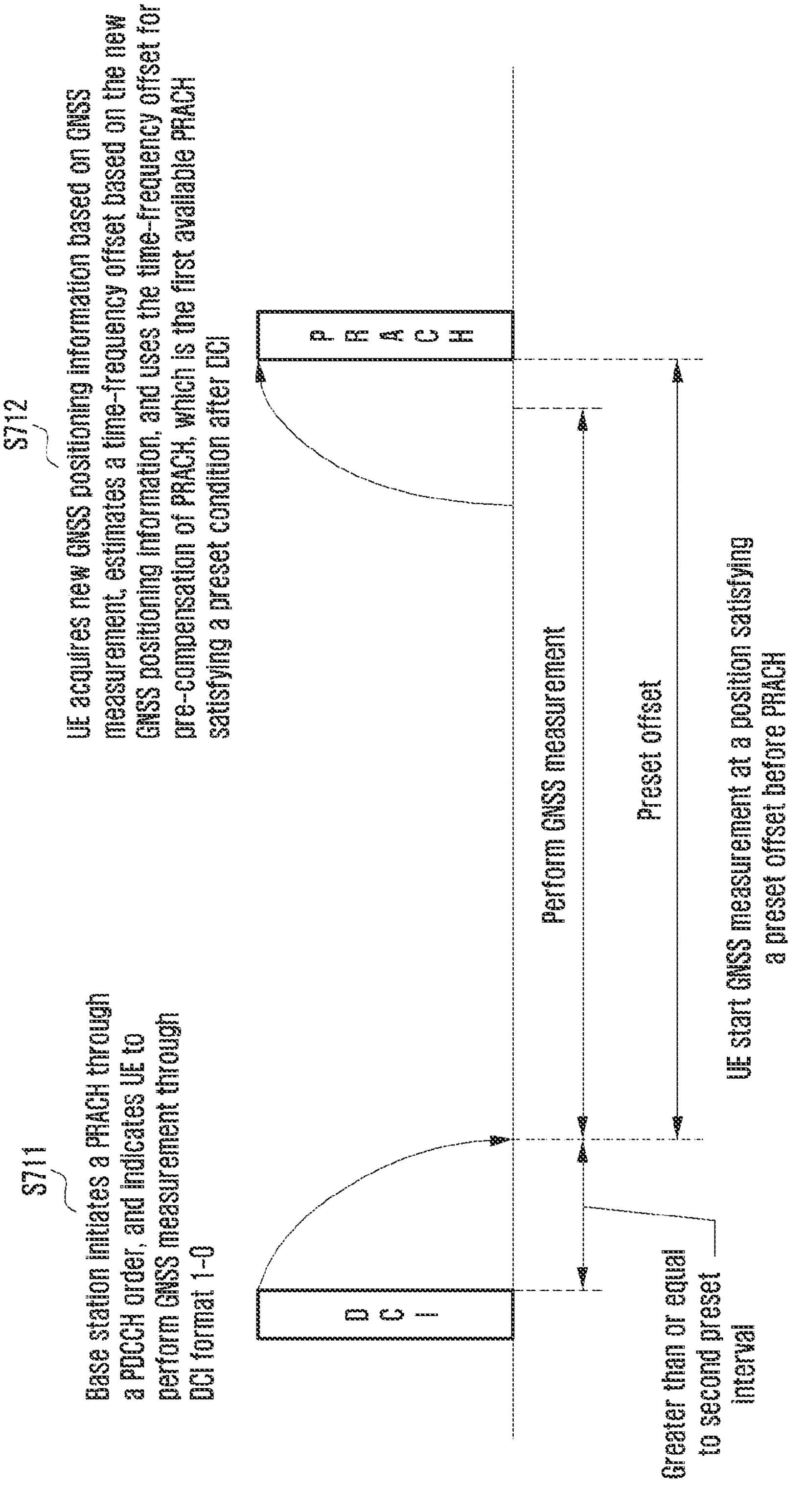
FIG. 7B illustrates a schematic diagram of performing GNSS measurement according to an embodiment.

FIG. 7B illustrates a schematic diagram of performing GNSS measurement according to an embodiment. In step 711, the gNB initiates a PRACH through a PDCCH order and indicates to the UE to perform GNSS measurement through DCI format 1-0. In step 712, the UE acquires new GNSS positioning information based on the GNSS measurement, estimates a time-frequency offset based on the new GNSS positioning information, and uses the time-frequency offset for pre-compensation of the PRACH, which is the first available PRACH satisfying a preset condition after DCI.

Specifically, a location where the UE starts the GNSS measurement (or a starting location of the GNSS measurement window) is determined based on the location of the PRACH, for example, the UE starts the GNSS measurement at a location satisfying a preset offset before the PRACH. The preset offset includes at least one of the time required for the UE to perform the GNSS measurement, the time required for the GNSS module to transfer the GNSS positioning information to the wireless communication module, the time required for the UE to estimate the time-frequency offset based on the GNSS positioning information, the preparation time for transmitting the PRACH, and the preset offset is predefined, preconfigured by the base station, or reported by the UE. This design ensures that the interval between the GNSS measurement and the PRACH is small enough to make the time-frequency offset for the pre-compensation of the PRACH closer to a real value, so as to improve the uplink transmission performance. The PRACH transmitted by the UE is a PRACH that is determined according to the PRACH mask index in the first radio frame or slot satisfying that the GNSS measurement is started after the DCI format 1-0 and the starting location satisfies the above preset offset. An interval between the location where the UE starts the GNSS measurement and the location of the DCI format 1-0 should not be less than the second preset interval, which includes the processing time for decoding the DCI format 1-0 by the UE, and the size of the second preset interval is predefined, configured by the base station, or reported by the UE. The specific locational relationship may be shown in FIG. 7B.

Figure 8:
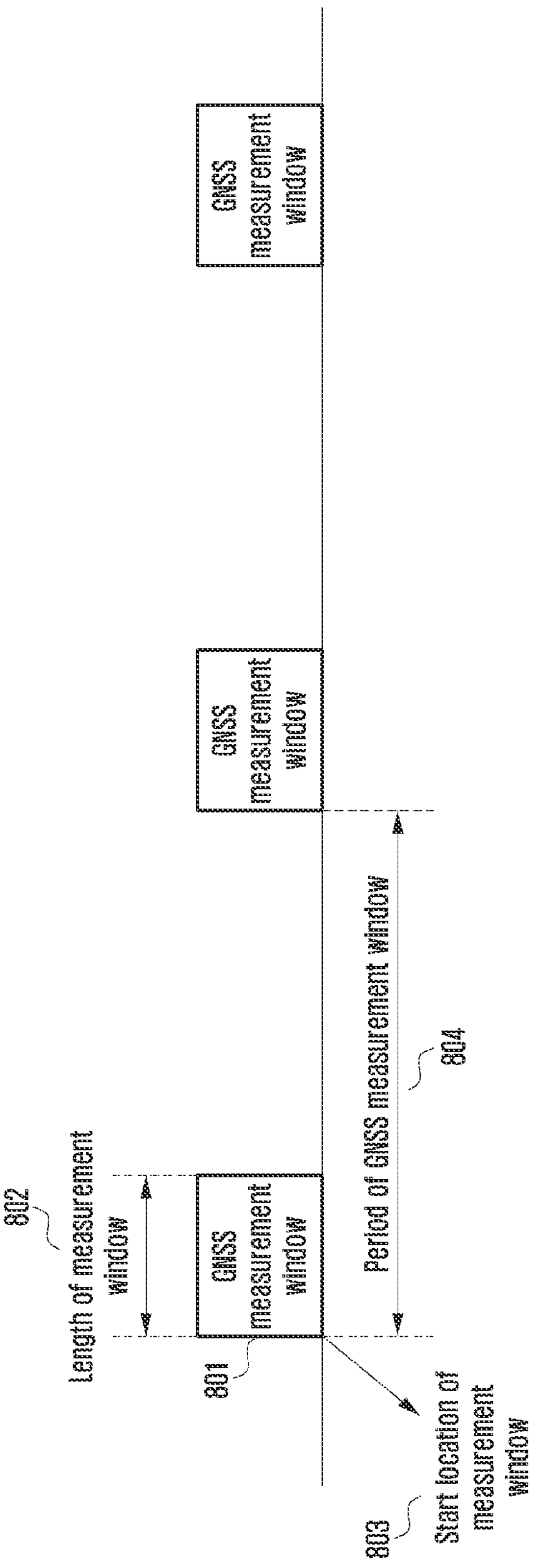
FIG. 8 illustrates a schematic diagram of a GNSS measurement window according to an embodiment.

FIG. 8 illustrates a schematic diagram of a GNSS measurement window according to an embodiment. In FIG. 8, the GNSS measurement window 801 is specified. For example, the base station configures the GNSS measurement window for the UE, and the UE is required to limit the GNSS measurement within the GNSS measurement window. Since the GNSS module and the wireless communication module of the UE cannot operate simultaneously, the UE does not expect to receive any downlink signal transmitted by the base station and/or does not expect to transmit any uplink signal to the base station within the GNSS measurement window. The GNSS measurement window is introduced such that the base station and the UE may have a common understanding of the GNSS measurement performed at the UE side, to avoid unnecessarily using resources caused by the base station scheduling the UE within the GNSS measurement window. The length of the GNSS measurement window 802 includes at least one of a duration required for the UE to perform the GNSS measurement to acquire the GNSS positioning information once, the time required for the GNSS module of the UE to transfer the GNSS positioning information to the wireless communication module, a duration required for the UE to calculate the time offset and the frequency offset of a wireless link based on the GNSS positioning information.

The base station configures the GNSS measurement window for the UE through higher layer signaling, and a configuration parameter includes at least one of information such as a period of the GNSS measurement window, a length of the GNSS measurement window, a location of the GNSS measurement window, etc. For example, the configuration parameter of the GNSS measurement window is indicated by system information and/or UE-specific radio resource control (RRC) signaling. As shown in FIG. 8, the base station semi-statically configures the GNSS measurement window 801 for the UE through the above parameter, wherein the location of the GNSS measurement window has periodicity.

For the GNSS measurement triggered at the UE side, the UE is not required to limit the performing of the GNSS measurement within the GNSS measurement window. For example, once the UE triggers the acquiring of the new GNSS positioning information, the UE may immediately (start to) perform the GNSS measurement, and/or start to perform the GNSS measurement at a location satisfying the second preset interval after receiving an indication of the base station to perform the GNSS measurement, wherein the second preset interval is predefined, preconfigured by the base station, or reported by the UE, and/or the UE (starts to perform) performs the GNSS measurement at a location satisfying the preset offset before a next available PRACH transmission occasion, wherein the preset offset is predefined, preconfigured by the base station, or reported by the UE, and/or the UE decides when to (start to) perform the GNSS measurement based on the implementation. For example, the UE decides a duration to perform the GNSS measurement by itself, and/or completes the GNSS measurement within a duration not exceeding a preset length, which is predefined, preconfigured by the base station, or reported by the UE.

For the GNSS measurement triggered at the base station side or the UE side, the UE is required to limit the performing of the GNSS measurement within the GNSS measurement window. For example, once the UE triggers the acquiring of the new GNSS positioning information, and/or the base station indicates the UE to acquire the new GNSS positioning information, the UE performs the GNSS measurement within the first (or next) GNSS measurement window thereafter, and/or performs the GNSS measurement within the first GNSS measurement window satisfying the second preset interval after receiving an indication of the base station to perform the GNSS measurement, wherein the second preset interval is predefined, preconfigured by the base station, or reported by the UE, and/or the UE performs the GNSS measurement within a GNSS measurement window satisfying the preset offset before the next available PRACH transmission occasion and being closest to the PRACH, wherein the preset offset is predefined, preconfigured by the base station, or reported by the UE, and/or the UE decides to perform the GNSS measurement within a certain GNSS measurement window based on the implementation. For example, the UE decides to perform the GNSS measurement within a certain GNSS measurement window by itself, and/or use the time-frequency offset estimated based on the GNSS positioning information for the pre-compensation of uplink transmission at a location satisfying the third preset interval after the GNSS measurement window, wherein the third preset interval is predefined, preconfigured by the base station, or reported by the UE.

It should be noted that the above respective offsets refer to a distance between a start location of one time unit and a start location of another time unit, and the above respective intervals refer to a distance between an end location of one time unit and a start location of another time unit. The above time unit is a radio subframe, slot or symbol.

Herein, a UE reports some assistance information to the base station, which may assist the base station to determine whether to configure the GNSS measurement window for the UE, when to trigger the UE to perform the GNSS measurement, or determine the configuration information of the GNSS measurement window for the UE, so as to improve the GNSS operations. The assistance information reported by the UE includes at least one of:

- whether the GNSS positioning information of the UE is fixed, such as whether the location of the UE is stationary, then its GNSS positioning information is fixed, whether the GNSS module and the wireless communication module of the UE can operate simultaneously,
- whether the GNSS module and a transmitting module for wireless communication of the UE can operate simultaneously,
- whether the GNSS module and a receiving module for wireless communication of the UE can operate simultaneously, and
- whether the UE can acquire the GNSS positioning information from an application layer, for example, if an application layer service of the UE needs to report the GNSS positioning information, then the UE is not required to acquire the GNSS positioning information additionally, but directly uses the GNSS positioning information of the application layer.

The assistance information reported by the UE further includes at least one of a UE capability related to the GNSS measurement, for example, the system predefines two UE capabilities related to the GNSS measurement, and the UE reports one of them, wherein the two UE capabilities correspond to different GNSS measurement times, that is, UEs with two different capabilities need different times to complete the GNSS measurement to acquire the positioning information, at least one of a length of the GNSS measurement window 802, a period of the GNSS measurement window 804 and a start location of the GNSS measurement window 803 suggested by the UE, for example, the system predefines GNSS measurement windows with two lengths, and the UE reports one of the windows, the GNSS positioning information acquired by the UE and/or a reference time of the GNSS positioning information, and a validity time of the GNSS positioning information of the UE.

The above assistance information can optimize the triggering of the GNSS measurement at UE side by the base station and the configuring of the GNSS measurement window by the base station, so as to improve the GNSS operations and reduce unnecessary GNSS measurements, thereby reducing the power consumption of the UE, avoiding unnecessary scheduling of the UE by the base station during the GNSS measurement, and improving the effective utilization rate of resources.

A method of the disclosure further includes triggering, by the user equipment UE, the GNSS measurement when a first predefined condition is satisfied, wherein the first predefined condition includes at least one of there being data to be transmitted in an uplink logical channel buffer of the UE, a validity time of GNSS positioning information previously used by the UE expiring, a time alignment timer TimeAlignmentTimer of the UE expiring, a duration of a discontinuous reception DRX inactivity time of the UE exceeding a preset threshold value, an uplink of the UE being out of synchronization, a time interval from the last uplink transmission of the UE exceeding a preset threshold value, a moving distance of the UE exceeding a preset threshold value, and the UE continuously failing in N random access procedures, where N is an integer greater than 1 and reaches a preset threshold value.

A method of the disclosure further includes receiving, by the UE, a signaling from a base station, wherein the signaling is used to indicate the UE to perform the GNSS measurement.

The UE is indicated to perform the GNSS measurement by the base station through signaling when a second predefined condition is satisfied, and the second predefined condition includes at least one of there being downlink data to be transmitted for the UE, a validity time of GNSS positioning information previously used by the UE expiring, a time alignment timer TimeAlignmentTimer of the UE expiring, a duration of a discontinuous reception DRX inactivity time of the UE exceeding a preset threshold value, an uplink of the UE being out of synchronization, a time interval from the last uplink transmission of the UE exceeding a preset threshold value, and a moving distance of the UE estimated by the base station exceeding a preset threshold value.

A method of the disclosure further includes receiving, by the UE, downlink control information DCI from the base station, wherein a field in the DCI is used to indicate the UE to perform the GNSS measurement.

The DCI includes a specific DCI format, and a reserved bit in the specific DCI format is used to indicate the UE to perform the GNSS measurement to acquire the GNSS positioning information.

A random access procedure is initiated by the specific DCI format through a physical downlink control channel PDCCH order, and the time-frequency offset is estimated by the UE based on the GNSS positioning information for pre-compensation of a physical random access channel PRACH initiated by the specific DCI format.

The physical random access channel PRACH initiated by the specific DCI format is at a location satisfying a first preset interval after the specific DCI format, and the first preset interval is predefined, preconfigured by the base station, or reported by the UE.

Performing the GNSS measurement includes at least one of, when triggered by the UE or indicated by the base station immediately starting to perform the GNSS measurement, starting to perform the GNSS measurement at a location satisfying a second preset interval after receiving an indication of the base station to perform the GNSS measurement, wherein the second preset interval is predefined, preconfigured by the base station, or reported by the UE, starting to perform the GNSS measurement at a location satisfying a preset offset before a next available physical random access channel PRACH transmission occasion, wherein the preset offset is predefined, preconfigured by the base station, or reported by the UE, determining, by the UE, when to start to perform the GNSS measurement, completing the GNSS measurement within a duration not exceeding a preset length, wherein the preset length is predefined, preconfigured by the base station, or reported by the UE.

Performing the GNSS measurement includes determining a GNSS measurement window, and performing the GNSS measurement within the GNSS measurement window.

Any downlink signal transmitted by the base station is not expected to be received and/or any uplink signal is not expected to be transmitted to the base station within the GNSS measurement window.

Performing the GNSS measurement further includes at least one of, when the performing of the GNSS measurement is triggered by the UE or indicated by the base station performing the GNSS measurement within a next GNSS measurement window, performing the GNSS measurement within the first GNSS measurement window satisfying a second preset interval after receiving an indication of the base station to perform the GNSS measurement, wherein the second preset interval is predefined, preconfigured by the base station, or reported by the UE, performing the GNSS measurement within a GNSS measurement window satisfying a preset offset before a next available physical random access channel PRACH transmission occasion and being closest to the PRACH, wherein the preset offset is predefined, preconfigured by the base station, or reported by the UE, determining, by the user equipment UE, to perform the GNSS measurement within a certain GNSS measurement window, and using the time-frequency offset estimated based on the GNSS positioning information for the pre-compensation of uplink transmission at a location satisfying a third preset interval after the GNSS measurement window, wherein the third preset interval is predefined, preconfigured by the base station, or reported by the UE.

The GNSS measurement window is configured by higher layer signaling, and a configuration parameter of the GNSS measurement window is indicated by system information and/or user equipment UE-specific radio resource control RRC signaling.

The configuration parameter includes at least one of a period of the GNSS measurement window, a length of the GNSS measurement window, a location of the GNSS measurement window.

The various methods of the disclosure further include reporting, by the UE, assistance information to the base station, wherein the assistance information includes at least one of whether the GNSS positioning information of the UE is fixed, whether a GNSS module and a wireless communication module of the UE can operate simultaneously, whether the GNSS module and a transmitting module for wireless communication of the UE can operate simultaneously, whether the GNSS module and a receiving module for wireless communication of the UE can operate simultaneously, whether the UE can acquire the GNSS positioning information from an application layer, a UE capability related to the GNSS measurement, at least one of a length, a period of the GNSS measurement window 804 and a start location of the GNSS measurement window 803 preferred by the UE, the GNSS positioning information of the UE and/or a reference time of the GNSS positioning information; and a validity time of the GNSS positioning information of the UE.

Figure 9:
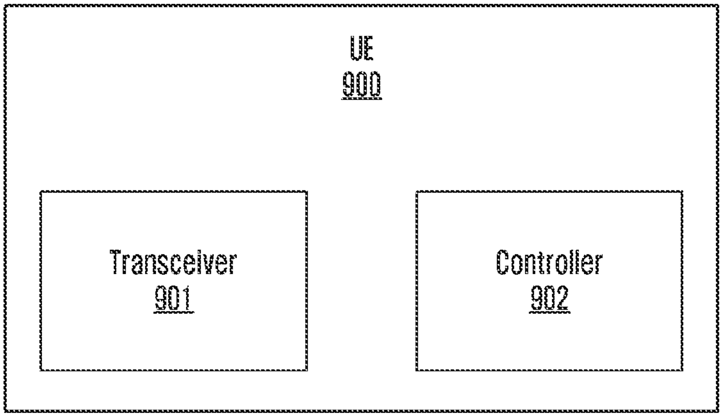
FIG. 9 illustrates a block diagram of a UE according to an embodiment.

FIG. 9 illustrates a block diagram of a configuration of a user equipment (UE) 900 according to an embodiment.

Referring to FIG. 9, a UE 900 may include a transceiver 901 and a controller 902. For example, the transceiver 901 may be configured to transmit and receive signals. For example, the controller 902 may be coupled to the transceiver 901 and configured to perform the aforementioned methods.

Figure 10:
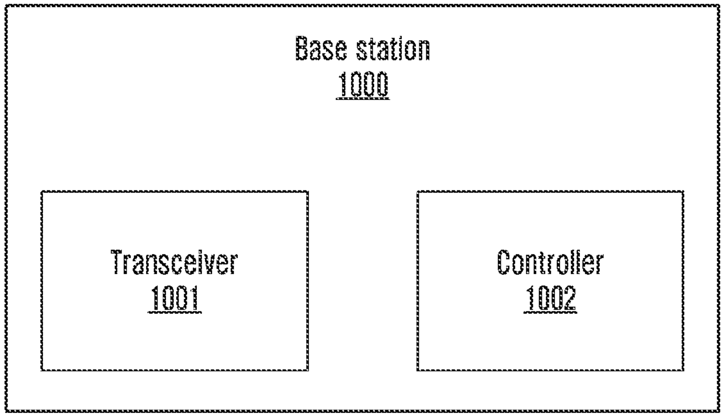
FIG. 10 illustrates a block diagram of a base station according to an embodiment.

FIG. 10 illustrates a block diagram of a configuration of a base station according to an embodiment.

Referring to FIG. 10, a base station 1000 may include a transceiver 1001 and a controller 1002. The transceiver 1001 may be configured to transmit and receive signals and may be coupled to the transceiver 1001 and configured to perform the aforementioned methods.

Although the UE and the base station are illustrated as having separate functional blocks for convenience of explanation, the configurations of the UE and the base station are not limited thereto. For example, the UE and the base station may include a communication unit including a transceiver and a controller. The UE and the base station may communicate with at least one network node by means of the communication unit.

Various functions described herein can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Operations performed by modules, programming modules or other components according to various embodiments of the disclosure may be performed sequentially, in parallel, repeatedly or heuristically, or at least some operations may be performed in a different order or omitted, or other operations may be added.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a user equipment (UE) for acquiring global navigation satellite system (GNSS) positioning information, the method comprising:

receiving, from a base station, a first indication based on a first subframe, wherein the first indication indicates that the UE is triggered to perform GNSS measurement;

identifying that the UE is triggered to perform the GNSS measurement based on the first indication;

performing the GNSS measurement to acquire the GNSS positioning information based on a GNSS measurement window; and estimating at least one of a time offset or a frequency offset based on the GNSS positioning information for pre-compensation of uplink transmission, wherein a start location of the GNSS measurement window corresponds to a second subframe that is after a predefined interval from the first subframe.

2. A method performed by a base station for indicating to a user equipment (UE) to acquire global navigation satellite system (GNSS) positioning information, the method comprising:

determining to trigger the UE to perform global navigation satellite system (GNSS) measurement;

transmitting a first indication to the UE based on a first subframe, wherein the first indication indicates that the UE is triggered to perform GNSS measurement to acquire the GNSS positioning information; and receiving, from the UE, information associated with GNSS measurement, wherein the GNSS measurement is associated with a GNSS measurement window, wherein a start location of the GNSS measurement window corresponds to a second subframe that is after a predefined interval from the first subframe, and wherein at least one of a time offset or a frequency offset is associated with the GNSS positioning information for pre-compensation of uplink transmission.

3. A user equipment (UE) comprising:

a transceiver configured to transmit and receive signals; and a processor coupled to the transceiver and configured to:

receive, from a base station, a first indication based on a first subframe, wherein the first indication indicates that the UE is triggered to perform global navigation satellite system (GNSS) measurement, identify that the UE is triggered to perform the GNSS measurement based on the first indication, perform the GNSS measurement to acquire the GNSS positioning information based on a GNSS measurement window, and estimate at least one of a time offset or a frequency offset based on the GNSS positioning information for pre-compensation of uplink transmission, wherein a start location of the GNSS measurement window corresponds to a second subframe that is after a predefined interval from the first subframe.

4. A base station comprising:

a transceiver configured to transmit and receive signals; and a processor coupled to the transceiver and configured to:

determine to trigger a user equipment (UE) to perform global navigation satellite system (GNSS) measurement, transmit a first indication to the UE based on a first subframe, wherein the first indication indicates that the UE is triggered to perform the GNSS measurement to acquire GNSS positioning information, and receive, from the UE, information associated with the GNSS measurement, wherein the GNSS measurement is associated with a GNSS measurement window, wherein a start location of the GNSS measurement window corresponds to a second subframe that is after a predefined interval from the first subframe, and wherein at least one of a time offset or a frequency offset is associated with the GNSS positioning information for pre-compensation of uplink transmission.

5. The method of claim 1, wherein the first indication is included in a message received based on the first subframe, and wherein the message further includes a second indication indicating a length of the GNSS measurement window.

6. The method of claim 1, wherein the first indication is 1 bit, and a value of the first indication being a first value indicates that the UE is triggered to perform the GNSS measurement, and wherein the predefined interval corresponds to a number of subframes.

7. The method of claim 1, further comprising: transmitting, to the base station, a preferred length of the GNSS measurement window for the UE, and wherein a downlink signal from the base station is not expected to be received within the GNSS measurement window.

8. The method of claim 1, further comprising:

receiving, from the base station, configuration information associated with triggering of GNSS measurement by the UE;

identifying a validity time for previous GNSS position information is expired; and performing the GNSS measurement triggered by the UE based on a GNSS measurement window after identifying the validity time is expired.

9. The method of claim 1, further comprising:

performing GNSS measurement triggered by the UE based on a GNSS measurement window identified by the UE.

10. The method of claim 2, wherein the first indication is included in a message transmitted based on the first subframe, and wherein the message further includes a second indication indicating a length of the GNSS measurement window.

11. The method of claim 2, wherein the first indication is 1 bit, and a value of the first indication being a first value indicates that the UE is triggered to perform the GNSS measurement, and wherein the predefined interval corresponds to a number of subframes.

12. The method of claim 2, further comprising: receiving, from the UE, a preferred length of the GNSS measurement window for the UE, and wherein a downlink signal of the base station is not expected to be transmitted within the GNSS measurement window.

13. The UE of claim 3, wherein the first indication is included in a message received based on the first subframe, and wherein the message further includes a second indication indicating a length of the GNSS measurement window.

14. The UE of claim 3, wherein the first indication is 1 bit, and a value of the first indication being a first value indicates that the UE is triggered to perform the GNSS measurement, and wherein the predefined interval corresponds to a number of subframes.

15. The UE of claim 3, wherein the processor is further configured to transmit, to the base station, a preferred length of the GNSS measurement window for the UE, and wherein a downlink signal from the base station is not expected to be received within the GNSS measurement window.

16. The UE of claim 3, wherein the processor is further configured to:

receive, from the base station, configuration information associated with triggering of GNSS measurement by the UE;

identify a validity time for previous GNSS position information is expired; and perform the GNSS measurement triggered by the UE based on a GNSS measurement window after identifying the validity time is expired.

17. The UE of claim 3, wherein the processor is further configured to:

perform GNSS measurement triggered by the UE based on a GNSS measurement window identified by the UE.

18. The base station of claim 4, wherein the first indication is included in a message transmitted based on the first subframe, and wherein the message further includes a second indication indicating a length of the GNSS measurement window.

19. The base station of claim 4, wherein the first indication is 1 bit, and a value of the first indication being a first value indicates that the UE is triggered to perform the GNSS measurement, and wherein the predefined interval corresponds to a number of subframes.

20. The base station of claim 4, wherein the processor is further configured to receive, from the UE, a preferred length of the GNSS measurement window for the UE, and wherein a downlink signal of the base station is not expected to be transmitted within the GNSS measurement window.

* * * * *